July 3, 1923.

J. H. LOGGINS

AIR INLET DEVICE

Filed May 3, 1921

1,460,550

John H. Loggins
INVENTOR

BY *Victor J. Evans*
ATTORNEY

WITNESS:

Patented July 3, 1923

1,460,550

UNITED STATES PATENT OFFICE.

JOHN H. LOGGINS, OF FORDYCE, ARKANSAS.

AIR-INLET DEVICE.

Application filed May 3, 1921. Serial No. 466,394.

*To all whom it may concern:*

Be it known that I, JOHN H. LOGGINS, a citizen of the United States, residing at Fordyce, in the county of Dallas and State of Arkansas, have invented new and useful Improvements in Air-Inlet Devices, of which the following is a specification.

My present invention has reference to an attachment for the fuel intake manifolds of gasoline engines.

My object is to produce a device whereby warm air from the exhaust manifold may be delivered to the mixture let into the intake manifold to more effectively gasify the same, the device being also susceptible for use for admitting atmospheric air into the manifold after the engine has become thoroughly heated to produce a leaner mixture.

The drawings illustrate a satisfactory embodiment of the improvement reduced to practice, and in the said drawings:—

Figure 1:
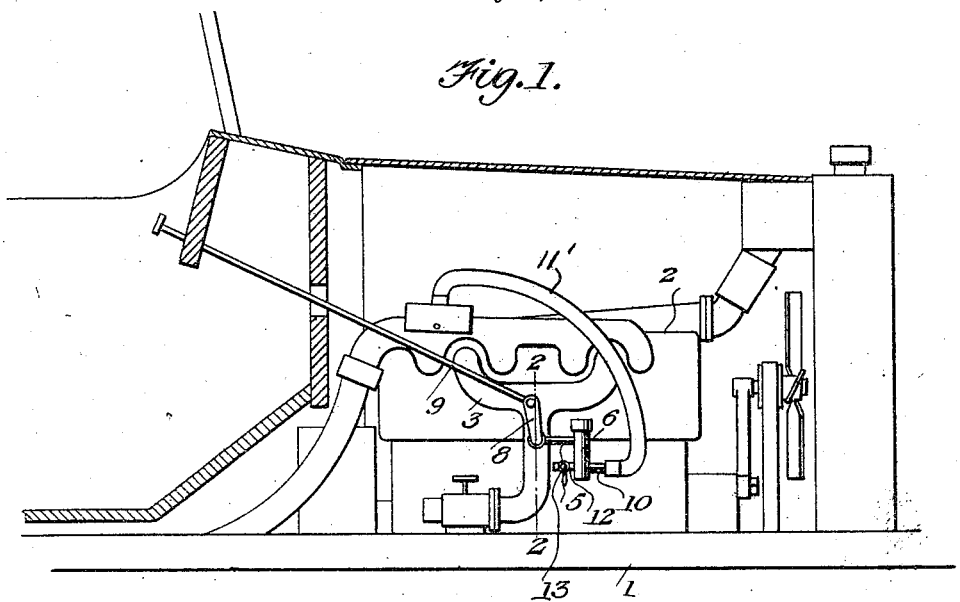
Figure 1 is a view illustrating the application of the improvement.
Figure 2:
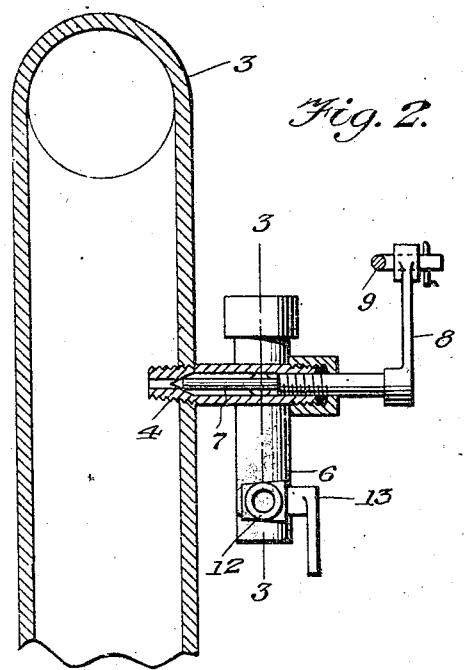
Figure 2 is a sectional view approximately on the line 2—2 of Figure 1.
Figure 3:
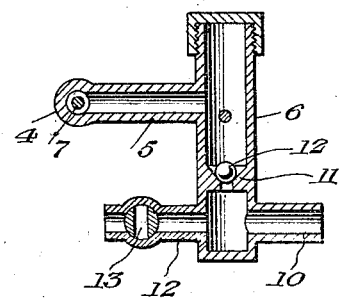
Figure 3 is a sectional view approximately on the line 3—3 of Figure 2.

A portion of an automobile is indicated by the numeral 1, the gasoline engine therefor by the numeral 2, and the intake manifold by the numeral 3. My improvement comprises a nipple 4 which is screwed into the vertical pipe of the intake manifold 3 and which is provided with a branch pipe 5 leading to a cylindrical chamber 6. The passage between the branch pipe 5 and the nipple is controlled by a needle valve 7. The valve is threaded in the nipple and has its stem, which projects through the nipple formed with an offset portion or handle 8 to which is connected a rod 9 that leads to the dash of the vehicle. Thus the valve may be adjusted from the driver's seat. The chamber 6 is provided with a branch pipe 10 which is in communication with the exhaust manifold of the engine through the medium of a conductor pipe 11' as shown in Figure 1 of the drawings. In the chamber 6 there is a concaved valve seat 11 that is normally closed by a ball valve 12. When the engine is idling, this valve is seated, but when in motion and the valve 7 is open, the suction in the intake manifold will unseat the valve, permitting hot air to flow through the branch 10, chamber 6, branch pipe 5 and nipple 4 into the manifold, where such air is mixed with the charge, and will more effectively gasify the same. When the engine is run sufficiently to thoroughly heat the same, fresh atmospheric air may be admitted into the chamber 6 through a tubular member 12 which is either integrally formed with or connected to the chamber 6 below the valve seat 11. The passage through the tube 12 is controlled by a valve 13, the operating handle 14 of which may be provided with a rod extension leading to the dash of the vehicle.

Having described the invention, I claim:—

In an air inlet device for internal combustion engines, a nipple screwed in the intake manifold for the engine, a chamber connected to and communicating with the nipple, a needle valve controlling the passage through the nipple, a valve seat in the chamber adjacent to the bottom thereof, a ball valve for said seat, a branch pipe communicating with the chamber below the valve seat, a pipe connected thereto and connected with the exhaust manifold of the engine, a second short pipe arranged opposite said last mentioned short pipe, communicating with the chamber below its valve seat, and a valve controlling the passage through the last mentioned short pipe.

In testimony whereof I affix my signature.

JOHN H. LOGGINS.